(12) United States Patent
Johns et al.

(10) Patent No.: US 11,693,082 B2
(45) Date of Patent: *Jul. 4, 2023

(54) MOBILE DEVICE LOCATION

(71) Applicant: Intercept LLC, Plano, TX (US)

(72) Inventors: Nicholas Patrick Johns, Tampa, FL (US); Cory A Moreira, Tampa, FL (US)

(73) Assignee: Intercept LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/552,128

(22) Filed: Dec. 15, 2021

(65) Prior Publication Data

US 2022/0357465 A1     Nov. 10, 2022

Related U.S. Application Data

(63) Continuation of application No. 16/901,247, filed on Jun. 15, 2020, now abandoned, which is a continuation of application No. 16/150,809, filed on Oct. 3, 2018, now Pat. No. 10,684,376, which is a continuation of application No. 15/578,798, filed as application No. PCT/US2016/035536 on Jun. 2, 2016, now abandoned.

(60) Provisional application No. 62/169,904, filed on Jun. 2, 2015.

(51) Int. Cl.
*H04W 4/02*     (2018.01)
*G01S 5/00*     (2006.01)
*G01S 19/34*    (2010.01)
*G01S 19/48*    (2010.01)

(52) U.S. Cl.
CPC .............. *G01S 5/01* (2020.05); *G01S 19/34* (2013.01); *G01S 19/48* (2013.01); *H04W 4/02* (2013.01); *H04W 4/025* (2013.01)

(58) Field of Classification Search
CPC ....... H04W 4/02; H04W 4/025; H04W 4/021; G01S 19/48; G01S 19/34; G01S 5/01
See application file for complete search history.

(56) References Cited

U.S. PATENT DOCUMENTS

| | | | |
|---|---|---|---|
| 9,906,915 B2 * | 2/2018 | Haro | G01S 5/0284 |
| 10,684,376 B2 | 6/2020 | Johns et al. | |
| 2007/0111735 A1 | 5/2007 | Srinivasan et al. | |
| 2007/0232321 A1 * | 10/2007 | Casati | H04W 60/04 455/450 |
| 2010/0283676 A1 | 11/2010 | Hatami et al. | |

(Continued)

FOREIGN PATENT DOCUMENTS

| | | |
|---|---|---|
| WO | 2014/169343 A1 | 10/2014 |
| WO | 2015/006819 A1 | 1/2015 |

OTHER PUBLICATIONS

Extended European Search Report for Application No. 16804445.1 dated Apr. 11, 2019.

(Continued)

*Primary Examiner* — Marcos L Torres
(74) *Attorney, Agent, or Firm* — Merchant & Gould P.C.

(57) ABSTRACT

Determining location of a mobile device includes determining the proximity of the mobile device to a predetermined location. Based on the proximity determination, a locational accuracy criterion is selected and the location of the mobile device is determined according to the selected locational accuracy criterion.

20 Claims, 3 Drawing Sheets

(56) References Cited

U.S. PATENT DOCUMENTS

| | | |
|---|---|---|
| 2011/0140849 A1 | 6/2011 | Matus et al. |
| 2011/0279323 A1 | 11/2011 | Hung et al. |
| 2012/0119948 A1 | 5/2012 | Tsuda |
| 2013/0346205 A1 | 12/2013 | Hogg et al. |
| 2014/0280541 A1 | 9/2014 | Walter et al. |
| 2018/0284218 A1* | 10/2018 | Eldic .................... G01S 5/0263 |

OTHER PUBLICATIONS

International Search Report and Written Opinion of the International Searching Authority for corresponding International Patent Application No. PCT/US2016/035536 dated Sep. 12, 2016, 7 pages.

* cited by examiner

MOBILE DEVICE LOCATION

This application is a Continuation of U.S. patent application Ser. No. 16/901,247, filed Jun. 15, 2020, now abandoned, which is a Continuation of U.S. patent application Ser. No. 16/150,809, filed Oct. 3, 2018, now U.S. Pat. No. 10,684,376, which is a Continuation of U.S. patent application Ser. No. 15/578,798, filed Dec. 1, 2017, now abandoned, which is a National Stage Application of PCT/US2016/035536, filed Jun. 2, 2016, which claims the benefit of U.S. Provisional Patent Application No. 62/169,904, filed Jun. 2, 2015, the disclosures of which are hereby incorporated by reference herein in their entireties. To the extent appropriate, a claim of priority is made to each of the above disclosed applications.

BACKGROUND

Applications ("apps") for various computing devices, and particularly mobile computing devices such as smart phones, sometimes require knowledge of the device's location. The location of the device can be accomplished in various ways, such as global positioning systems (GPS) and analysis of information from WiFi and cell towers, for example. Different processes for determining device location may have varying levels of accurateness, and the device resources required to determine device location may vary among different locational awareness processes.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense.

Some computer applications ("apps"), particularly mobile device apps, require determining the location of the device. A user device, such as a mobile computer or smart phone, may be associated with a user. As is well known, mobile devices are configured to run a plurality of apps, such as email apps, social networking apps, global positioning system (GPS) apps, calendar apps, weather apps, etc. Some apps, such as navigation apps that provide driving directions, require highly accurate determination of the device location (and thus the vehicle location) and constant updating of the device location to provide accurate turn-by-turn driving directions. The constant determination and updating of location by a mobile device, especially if using GPS technology, can use significant device resources. Constant determination and updating of the device's location may consume the device's battery, requiring frequent recharging.

For example, copending U.S. Patent Application Publication No. 2013/0346205A1, which is incorporated by reference in its entirety, discloses a locational messaging system. Traditionally, the delivery of digital content (message forum postings, email, text messages, SMS, video files, graphics files, audio files, etc.) is organized around a universal resource locator (URL), telephone number, email address, etc. However, locational messaging systems deliver content based on the location of the mobile device.

In some disclosed examples, a customer or potential customer is provided an incentive to leave one location, such as the location of a competitive merchant, and go to another merchant's establishment. In other examples, a customer or potential customer is presented with a notification or alert upon entry into a geographic area, such as a region of a street or road. Upon "swiping" of the notification or alert, or other such similar interaction, the user may be presented with a message such as a full-screen image, HTML 5 rich media experience, a video, etc. Returning to the example in which a customer is provided an incentive to leave one establishment to go to another, a geographic area including a commercial location or otherwise associated with a commercial location such as a parking lot is defined. According to some embodiments, the geographic area or the boundary defining the geographic area is sometimes referred to herein as a "bounding box." In some examples, the bounding box is a rectangular box that circumscribes the "geographic area." If the geographic area is rectangular, the bounding box and the geographic area may be the same. In some instances, it is possible for the geographic area to have a shape other than rectangular. This is addressed in some embodiments by maintaining a rectangular bounding box that circumscribes the non-rectangular geographic area, or by defining a non-rectangular bounding box. According to some embodiments, a geographic area may have a shape that is polygonal. In some instances, the definition of the geographic area may include a set of vertices defining the polygonal area. A geographic area or bounding box is sometimes referred to herein as a "target."

In some implementations, the geographic area, or target, is defined by a merchant representing a business establishment such as a restaurant. The commercial location can be defined by the merchant or other user using a computer application. When a mobile device, and thus the user of the device, is located in some predetermined proximity to the target, such as within the target, a message and/or some form of incentive may be sent to the mobile device. To accomplish this, it is necessary to monitor the location of the device.

Figure 1:
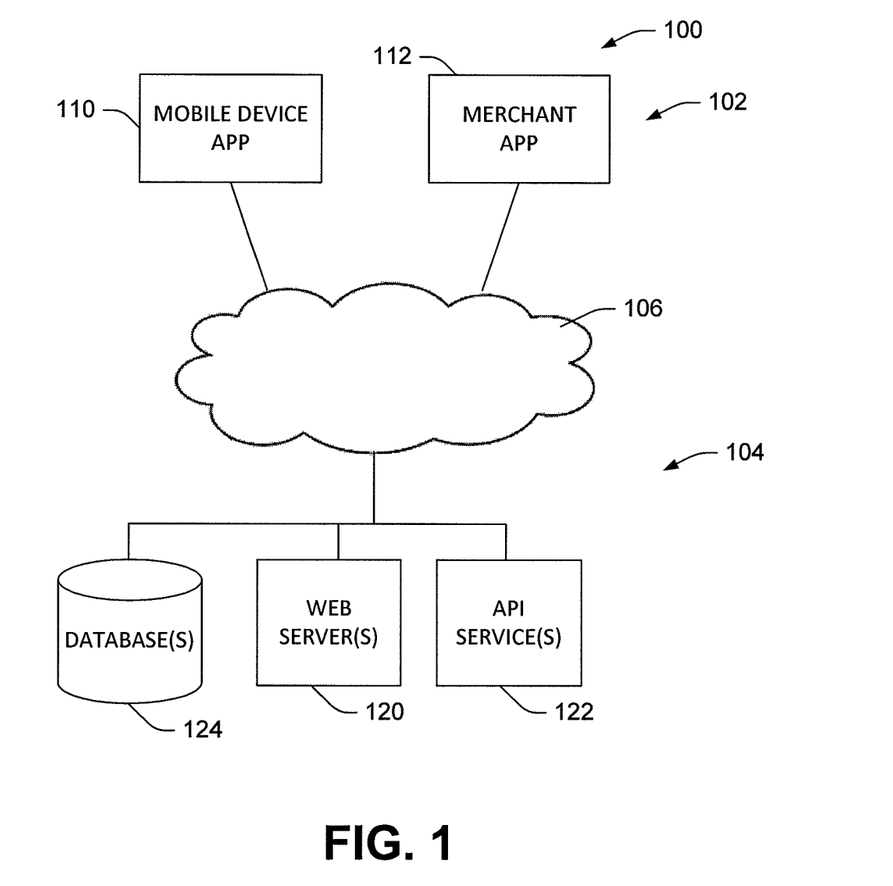
FIG. 1 illustrates aspects of an example of a locational awareness system in accordance with the present disclosure.

FIG. 1 illustrates an example of portions of a system 100 configured to implement certain methods disclosed herein. At a very basic level, the system 100 includes a front-end 102, a back-end 104, and a communication interface 106 such as the internet. Examples of the front-end 102 include a graphical user interface application granted to a user. A front-end application accesses and manipulates data in the back-end 104. In the illustrated embodiment, the front-end 102 includes a mobile device application 110, such as an iPhone® or Android® app running on a mobile device, and a web based merchant portal front-end application 112 operating on any suitable device capable of communicating with the internet 106. According to some embodiments, the mobile device application 110 may be an application created and/or published by a party unrelated to the party using the campaign portal 112 to establish a locational messaging or advertising campaign. In such cases, the back-end 104 may communicate to with a network of third-party applications, each of which contains a software development kit (SDK)

performing the various services and operations described herein. In other words, parties willing to present locational advertising or messages of the nature described herein through their applications would include the SDK in their applications in order to acquire the capability to do so. Those wanting to have their locational messaging or advertising campaigns delivered via participating third-party applications would create their locational advertising and messaging campaigns via the campaign portal 112. The illustrated back-end 104 includes server-based applications, services, and persistence layers that are deployed to dedicated hardware systems or cloud based environments, for example. Thus, example implementations of the back-end 104 include one or more web servers 120 that include appropriately programmed processing devices, API services 122 and memory devices 124 including databases, program code, etc.

Figure 2:
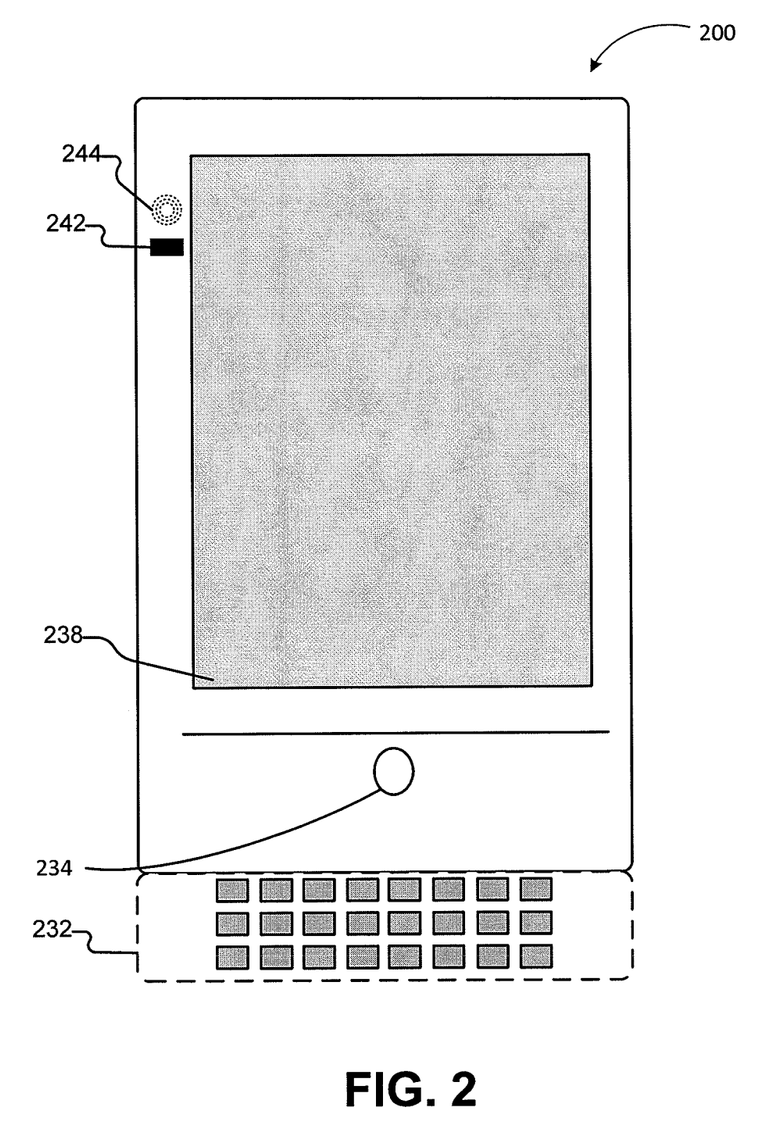
FIG. 2 is schematically illustrates an example of a mobile device.

FIG. 2 illustrates an example mobile device 200, such as a smart phone, a Personal Digital Assistant (PDA), a smart automobile console, or in any other form. As such, a device configured for location awareness systems and other applications in accordance with disclosed embodiments may include additional or fewer components and features than those shown in FIG. 2. The example device 200 may include typical components of a mobile communication device such as a hard keypad 232, one or more specialized buttons ("function keys") 234, display 238, and one or more indicators (e.g. LED) 242. The device 200 may also include a speaker 244 for voice communications. The display 238 may be an interactive display (e.g. touch sensitive) and provide soft keys as well.

To avoid frequent recharging of the mobile device 200, disclosed embodiments operate in a manner that permits mobile devices to enter a low power or "sleep" state as often as possible while monitoring device location. In particular, permitting the GPS subsystem to sleep is important, as its operation is "expensive" from a power consumption point of view.

According to some embodiments, to permit the GPS subsystem to sleep, the device is configured to operate on the basis of locational data derived from other sources, such as WiFi and cell tower information (for example, cellular triangulation), as often as possible. The device communicates with the back end 104 to obtain a set of data describing the location and shape of nearby targets. In some embodiments, the device receives data describing bounding boxes. In some embodiments, the device receives data defining polygonal shapes or circular shapes. GPS is turned on only as the device comes into proximity of a target, and more accuracy is needed to properly determine target entry. Thus, the method by which location of the mobile device is determined is selected based on proximity of the device to a particular target. To allow for target detection, while at the same time permitting the GPS subsystem to sleep often, "zones" of proximity to a target may be defined.

Figure 3:
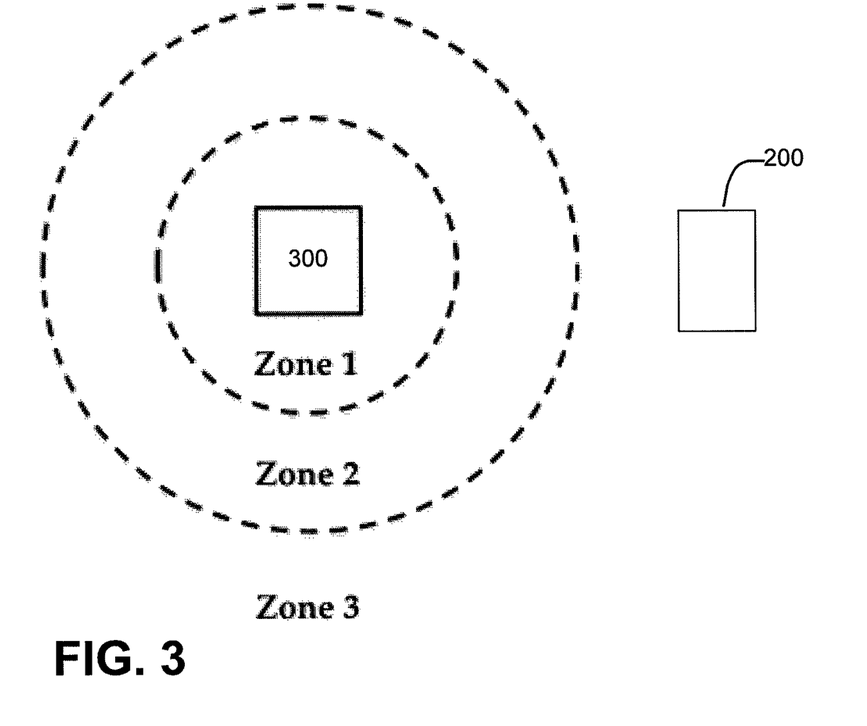
FIG. 3 illustrates an example of a target with three defined surrounding Zones.

As shown in FIG. 3, a target 300 is depicted with n zones surrounding it. Although the target 300 is depicted as being rectangular, the target 300 may be polygonal or circular, as discussed above. In the example illustrated in FIG. 3, three zones surround the target 300. Zone 1 is a region of space within a certain distance from the target 300. Distance from a target may be calculated as distance from the nearest edge of the target, or distance from the nearest vertex or corner of the target, or distance from the centroid of the target. For the sake of simplicity only, this document will discuss zones as being defined as regions of space from a centroid of a target, with the understanding that a zone refers to regions of space that are a certain distance from a target and that other definitions of distance from a target may also be used, including any of the aforementioned methods. Zone 1 is a region of space within a certain radius of the centroid of the target 300. For example, Zone 1 may be defined as a region of space within 100 meters of the centroid of the target 300. Again, Zone 1 may be defined as the region of space within 100 meters of the edge of the target 300, or within 100 meters from the various vertices of the target 300. Zone 2 is a region of space extending further out from the centroid of the target 300 than Zone 1. For example, Zone 2 may be defined as a region of space greater than 100 meters from the centroid of the target 300, but within 450 meters of its centroid. Finally, Zone 3 may be defined as all space outside of Zone 2. Continuing with the example, Zone 3 is thus defined as all space further than 450 meters from the centroid of the target 300.

When a mobile device such as the device 200 is in Zone 3 (as is depicted in FIG. 3), the device's GPS may be turned off, and locational information derived by other means, such as WiFi and cell tower information. In some examples, this means requesting locational information with a low required accuracy, such as 3000 meters. Thus, when in Zone 3, the device will rely upon locational information other than GPS data, such as WiFi and/or cell tower information, and produce locational results that, in the context of most urban or suburban environments, are accurate to within a city block (despite the fact that the requested accuracy may be set to 3000 meters). Additionally, locational updates may be requested to occur at a relatively infrequent basis to reduce CPU workload. For example, locational updates may be requested only when the device 200 has moved 50 meters, or after some predetermined time period associated with Zone 3 has expired.

As the device 200 moves towards the target 300, it enters Zone 2. Upon detection of the device 200 in Zone 2, the requested accuracy and frequency of positional updates may be enhanced. For example, in Zone 2, accuracy may be requested to be within 10 meters, and locational updates may be requested upon the device 200 having moved 10 meters or after a shorter time period has expired. The purpose of Zone 2 is to obtain locational information that is just good enough and frequent enough to promptly determine that: (1) the Device 200 has moved into Zone 1 and locational update accuracy and frequency need to be enhanced; or (2) the Device 200 has returned to Zone 3 and the locational update accuracy and frequency can be returned to a low state to save power.

Finally, when the device 200 is in Zone 1, the requested locational accuracy may be improved to the best accuracy that can be obtained, and the locational update frequency may be increased to obtain updates whenever the device 200 has moved 5 meters. High accuracy combined with frequent updates allows for rapid and accurate detection of target entry.

To permit the "three zone" scheme of the example discussed above to be employed, in response to a front end system call to obtain target information, or in response to another call by the device to the backend, such as a call specifically designated for the purpose of requesting zone definition information, the back end should respond with data corresponding to the defined zones. An example of such data is shown in Table 1.

TABLE 1

| | | |
|---|---|---|
| Radius for Zone 1 | Requested Locational Accuracy in Zone 1 | Requested Distance Between Locational Updates |
| Example: within 100 meters | Example: BEST | Example: 5 meters |
| Radius for Zone 2 | Requested Locational Accuracy in Zone 2 | Requested Distance Between Locational Updates |
| Example: within 450 meters | Example: 10 meters | Example: 10 meters |
| Radius for Zone 3 | Requested Locational Accuracy in Zone 3 | Requested Distance Between Locational Updates |
| Example: further than 450 meters | Example: 3000 meters | Example: 50 meters |

Other zone configurations are possible. For example, a four-zone scheme may be defined as having a first zone including the region of space within 300 meters of a target. When in the first zone, the phone is configured to determine its accuracy to within 10 meters and to receive a locational callback to a delegate every time the phone moves 10 meters. A second zone is defined as the region of space outside of the first zone, but within 500 meters of the target. When in the second zone, the phone is configured to determine its accuracy to within 100 meters and to receive a locational callback to a delegate every time the phone moves 300 meters. A third zone is defined as the region of space outside of the second zone, but within 1000 meters of the target. When in the third zone, the phone is configured to determine its accuracy to within one kilometer and to receive a locational callback to a delegate every time the phone moves 500 meters. A fourth zone is defined as the region of space outside the third zone. When in the fourth zone, the phone is configured to determine its accuracy to within three kilometers and to receive a locational callback to a delegate every time the phone moves a kilometer.

Figure 4:
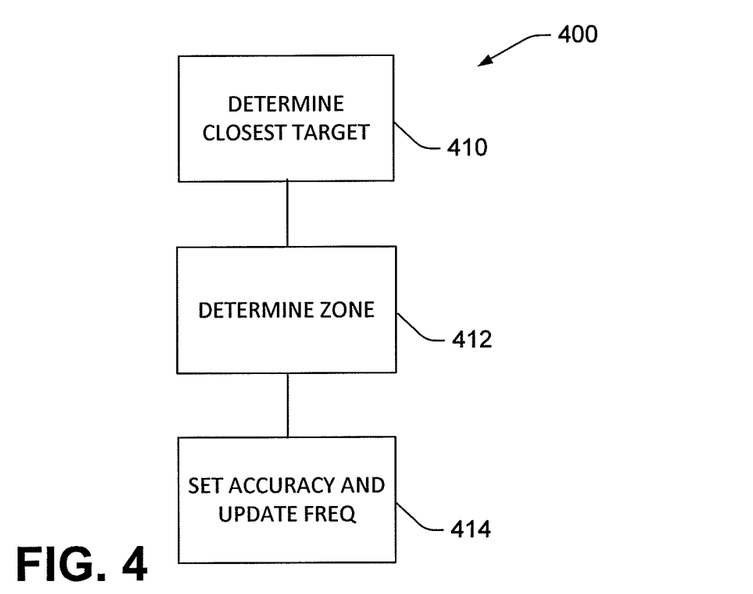
FIG. 4 is a flow diagram illustrating an example process for setting locational accuracy and update frequency.

Thus, according to the schemes disclosed in the preceding examples, the locational accuracy and update frequency of device 200 is determined by its distance from the target that is nearest to it. FIG. 4 is a flow diagram illustrating an example process 400 for determining locational accuracy and update frequency. In operation 410, the system determines which target is closest to the device 200. In operation 412, the system determines which zone the device 200 is in with respect to the target identified in operation 410. In operation 414, the requested locational accuracy and update frequency are set based upon the determined zone.

In the locational messaging system example discussed above, upon entry into a target, an incentive associated with a business establishment located within or associated with the target may be sent to the device 200. In disclosed examples, a service call is further made to the back end 104, and in response thereto the backend 104 removes the particular target that was just entered from the list of targets returned to the device, or otherwise designates that particular target as already having been entered. Its removal or designation as having been previously entered serves two purposes: (1) it prevents the incentive message from repeatedly being obtained by the device 200, until such time as the target is once again included in response to a service call; and (2) it eliminates a just-entered target from being considered when identifying the closest target pursuant to the three-step process articulated in conjunction with FIG. 3. Therefore, the device 200 is free to consider a different target as being the closest and determine which zone it is in vis-à-vis that particular target.

To guard against a situation in which a device comes to rest within proximity of a target without entering it (example: a user lives near a target, meaning that the user's device will be in proximity of a target when the user is at home, but that the device is unlikely to actually enter the target), some embodiments include the following scheme in which a timer is employed. If the device is sufficiently close to a target so that it is within a target's Zone 1 or Zone 2, but the device has not entered the target for more than a threshold period of time (example: 10 minutes), then the target should be disregarded for a period of time (3 hours). Both the threshold period and disregard period are communicated in the response to a relevant service call.

In some technical settings, such as in the case of devices running the iOS® operating system, the following configuration may be used to guard against using excessive energy in the event that the device is at rest or moving only trivially. In such a technical setting, a delegate object may be designated to receive locational updates, with each such update including locational information intended to conform to a desired accuracy, and with each such update intended to occur when the device has moved more than a chosen number of meters. The desired accuracy and number of meters between updates (also known as the distance filter) is determined by messaging a second object known as a location manager object. Starting and stopping of standard location monitoring is also controlled through messaging to the location manager object. Thus, in the event that it is known that the device is either not moving, or only moving in a trivial way, the location manager can be messaged to halt standard location monitoring during such periods, thereby saving power consumption that occurs by monitoring location even at very low desired accuracy.

Some iOS® devices include an accelerometer by which acceleration of the device may be measured. Detection of motion via use of the accelerometer offers very low-power motion monitoring. In such settings, a handler block object is ordinarily designated to receive motion activity updates from the accelerometer as they occur. Each motion activity update may include an activity type (example: walking, running, automotive, cycling, stationary, unknown) and confidence data indicating the level of confidence that the user of the device is actually engaged in such action. The motion activity type and confidence data are calculated by the motion framework within iOS®. Using the motion activity data, a determination may be made that the device is either not moving (example: the device is sitting inert on a table), or moving only trivially (example: the device is being held in the hand of a person who is pacing around his or her home or office while talking on the phone). In the event that it is determined that the device is either not moving or moving only trivially, the location manager object may be messaged to stop standard location services, thereby halting the power draw associated therewith.

Ordinarily, iOS® devices respond to a command to stop standard location services by suspending all of the threads of the particular application hosting the location manager object, if the application is executing in the background as a navigational app. Typically, this is problematic because the application loses its opportunity to subsequently message the location manager object to resume standard location services, because the background execution of the application has been entirely suspended. To overcome this, the aforementioned handler block object may be dispatched to a global queue of a chosen priority (example: background priority). The handler may be dispatched to the queue asynchronously. The global queues are shared across applications and other resources and are not associated exclusively with the host application. As a result, the handler block object will be assigned a thread upon provision of a motion activity update, and it can perform the steps required to determine whether the device is in a condition of non-trivial motion or not. If the device is in a state of non-trivial motion, the handler block object may message the location manager object to resume standard location services, which causes the threads of the host application to become unsuspended and the application to resume background execution. According to one embodiment, the handler block object may assess each motion activity update based upon the confidence level associated with the update, and only if the confidence level exceeds the lowest possible confidence (in the context of a confidence level that is articulated on an enumerated scale of 0, 1 and 2, the confidence level would have to be 1 or 2), the handler block object determines that the device is in a state of non-trivial motion if the activity type is anything other than stationary.

In some situations, a device may "straddle" two Zones. For example, if a user's home or work location is near the border separating two zones, the user could frequently move between the adjacent Zones. Additionally, error inherent in the locational data itself could cause an apparent fluctuation in zone, such as causing a Zone 2-Zone 3-Zone 2-Zone 3-Zone2 pattern of zone changes when the device is near a zone boundary. This could result in a situation in which the aforementioned timer repeatedly restarts (meaning that the target is not disregarded, and the associated power savings of such disregard is not attained) and the requested accuracy changes each time the zone changes. In some implementations, this may be addressed by providing "hysteresis" for Zone boundaries. In other words, once a device is determined to be located in a given Zone, the Zone boundary is increased, effectively increasing the size of the given Zone. This results in the boundary being crossed less often by the device, since the device has to travel farther to move outside the Zone. Upon exit of the increased zone boundary, the zone boundary may be reduced to its original size, so that the device must travel relatively closer to the target to enter a particular zone, and must travel relatively further from the target to exit the particular zone. In other embodiments, an additional timer is employed. Once a user has entered a given Zone, a subsequent exit of that Zone is ignored if re-entry into that Zone is observed prior to expiration of the additional timer. So, if the additional timer has a one-minute duration, for example, a zone exit will be honored only if the device is observed to have exited a zone and not re-entered that zone for a period of one minute.

The set of data used to define the "3-zone scheme" illustrated in Figure three includes, for example:
    radius of zone 1
    requested locational accuracy in zone 1
    requested distance between location updates in zone 1
    radius of zone 2
    requested locational accuracy in zone 2
    requested distance between location updates in zone 2
    requested locational accuracy in zone 3
    requested distance between location updates in zone 3
    threshold time for disregarding a target
    disregard time The preceding data set is be returned by the backend 104 in response to a service call from the mobile device 200.

In some examples, the latitudes and longitudes of each edge constituting the boundary of a given target 300 are defined. The backend 104 further may provide the location (latitude and longitude) of the centroid of each target, so that the device may calculate its distance from the centroid of each such target without having to calculate the position of the centroid based on the defined boundaries.

In some technical settings, such as devices running the Android® operating system, the following techniques may be used to minimize energy consumption while tracking the motion of a device toward or away from targets. In such technical settings, the location framework of Android® provides the opportunity to establish a distance threshold and a time threshold. A distance threshold defines the desired distance the device must move before a delegate object is updated with locational information. A time threshold defines the desired periodicity at which a determination should be made whether or not the distance threshold has been surpassed. For example, if the time threshold were to be set to one second, and the distance threshold were to be set to twenty meters, then once every second, a determination would be made whether or not the device had moved at least twenty meters. If so, then the delegate object is called with new locational data. The Android® location framework also permits the locational data to be of a requested priority level, which determines the desired accuracy of the locational data. According to some embodiments the priority or accuracy level may be selected to be of highest accuracy. According to some embodiments, with each locational update provided to the delegate object, the distance threshold may be re-calculated and set as a function of the distance of the device to the nearest target. Distance to a target may be defined many ways, including according to any of the schemes discussed in this document. For example, the distance filter may be calculated to be equal to one-tenth of the distance of the device to the nearest target. According to some embodiments, with each locational update provided to the delegate object, the time threshold may be re-calculated and set as a function of the distance of the device to the nearest target. Again, distance to a target may be defined many ways, including according to any of the schemes discussed in this document. For example, the time filter may be calculated to be equal to one-half of the distance filter (which, itself, may have been re-calculated to be one-half of the distance to the nearest target as just discussed), multiplied by one thousand, if expressed in milliseconds. According to some embodiments, the steps of determining the distance to the nearest target, adjusting the time threshold and distance threshold, and presenting a notification if the device is located at a proper relation to a target (such as within a target, or exiting a target, or having been within a target for more than a selected period of time) are organized as a service to the operating system. This permits the tracking and notification actions to be initiated whenever the operating system is initiated, meaning that, as a practical matter, these features will run whenever the device is operating.

Various modifications and alterations of this disclosure may become apparent to those skilled in the art without departing from the scope and spirit of this disclosure, and it should be understood that the scope of this disclosure is not to be unduly limited to the illustrative examples set forth herein.

What is claimed is:
1. A system, comprising:
    a mobile device including a mobile device application configured to:
        receive a target region having a polygonal or circular shape;

receive a plurality of zones, each of the zones defining a region of space that is a respective predetermined distance from a target located in the target region;

define a respective requested locational accuracy for each of the plurality of zones, wherein zones closer to the target have a higher accuracy than zones farther from the target;

determine a respective locational update frequency for each of the plurality of zones, wherein zones closer to the target update in response to less movement than zones farther from the target;

determine in which of the plurality of zones the mobile device is located;

select the requested locational accuracy based on the determined zone;

determine a location of the mobile device according to the selected requested locational accuracy;

select the locational update frequency based on the determined zone; and update the location of the mobile device according to the selected locational update frequency.

2. The system of claim 1, wherein the mobile device application is further configured to:

upon entry into the target region, receive an incentive associated with a business establishment located within or associated with the target region to the mobile device; and designate the target as having been entered to prevent repeatedly receiving the incentive message to the mobile device.

3. The system of claim 2, further comprising a back end computer system configured to send the target region to the mobile device;

send the plurality of zones to the mobile device; and send the incentive.

4. The system of claim 1, wherein each of the zones defines a region of space that is a respective predetermined distance from a centroid of the target.

5. The system of claim 4, wherein each of the zones defines a region of space that is a respective predetermined radius from the centroid of the target.

6. The system of claim 2, wherein the plurality of zones includes first, second and third zones that respectively define first, second and third radii relative to the target, and wherein the second radius is greater than the first radius, and the third radius is greater than the second radius.

7. The system of claim 6, further comprising:

if the mobile device is determined to be within zone 1 or zone 2, but the mobile device has not entered the target region for more than a threshold period of time, then disregarding the target for a predetermined period of time.

8. The system of claim 1, wherein the mobile device includes a GPS, and wherein the mobile application is further configured to turn off the GPS for the mobile device when the mobile device is located in a predetermined one of the plurality of zones.

9. A system, comprising:

a front end system including a mobile device application;

a back end system storing:

a target region;

a plurality of zones each defining a region of space that is a respective predetermined distance from a target located in the target region;

a respective locational accuracy for each of the plurality of zones, wherein zones closer to the target have a higher accuracy than zones farther from the target; and a respective locational update frequency for each of the plurality of zones, wherein zones closer to the target update in response to less movement than zones farther from the target;

wherein the mobile device application is configured to:

determine a location of the mobile device;

send the location of the mobile device to the back end system;

wherein the back end system is configured to:

determine in which of the plurality of zones the mobile device is located;

selecting the requested locational accuracy based on the determined zone;

selecting the locational update frequency based on the determined zone; and receive an updated location of the mobile device according to the selected locational update frequency;

upon entry into the target region by the mobile device, send an incentive associated with a business establishment located within or associated with the target region to the mobile device; and designate the target as having been entered to prevent repeatedly sending the incentive message to the mobile device.

10. The system of claim 9, wherein the target region has a polygonal or circular shape.

11. The system of claim 9, wherein each of the zones defines a region of space that is a respective predetermined distance from a centroid of the target.

12. The system of claim 11, wherein each of the zones defines a region of space that is a respective predetermined radius from the centroid of the target.

13. The system of claim 9, wherein the back end is configured to remove the target from a list of the targets.

14. The system of claim 10, wherein the plurality of zones includes first, second and third zones that respectively define first, second and third radii relative to the target, and wherein the second radius is greater than the first radius, and the third radius is greater than the second radius.

15. The system of claim 14, wherein the back end system is configured to:

if the mobile device is determined to be within zone 1 or zone 2, but the mobile device has not entered the target region for more than a threshold period of time, disregard the target for a predetermined period of time.

16. The system of claim 10, wherein the mobile device includes a GPS, and wherein the mobile application is further configured to turn off the GPS for the mobile device when the mobile device is located in a predetermined one of the plurality of zones.

17. A system, comprising:

a mobile device including a mobile device application configured to:

receive a target region having a polygonal or circular shape;

receive a plurality of zones, each of the zones defining a region of space that is a respective predetermined distance from a target located in the target region;

define a respective requested locational accuracy for each of the plurality of zones, wherein zones closer to the target have a higher accuracy than zones farther from the target;

determine a respective locational update frequency for each of the plurality of zones, wherein zones closer to the target update in response to less movement than zones farther from the target;

determine in which of the plurality of zones the mobile device is located;

select the requested locational accuracy based on the determined zone;

determine a location of the mobile device according to the selected requested locational accuracy;

select the locational update frequency based on the determined zone; and update the location of the mobile device according to the selected locational update frequency;

upon entry into the target region, receive an incentive associated with a business establishment located within or associated with the target region to the mobile device; and designate the target as having been entered to prevent repeatedly receiving the incentive message to the mobile device; and a back end computer system configured to:
send the target region to the mobile device;
send the plurality of zones to the mobile device; and
send the incentive.

18. The system of claim 17, wherein the back end is configured to remove the target from a list of the targets.

19. The system of claim 17, wherein the plurality of zones includes first, second and third zones that respectively define first, second and third radii relative to the target, and wherein the second radius is greater than the first radius, and the third radius is greater than the second radius.

20. The system of claim 17, wherein the mobile device includes a GPS, and wherein the mobile application is further configured to turn off the GPS for the mobile device when the mobile device is located in a predetermined one of the plurality of zones.

* * * * *